United States Patent [19]
Shreve et al.

[11] Patent Number: 5,703,656
[45] Date of Patent: Dec. 30, 1997

[54] DIGITAL PHASE ERROR DETECTOR FOR LOCKING TO COLOR SUBCARRIER OF VIDEO SIGNALS

[75] Inventors: Gregory A. Shreve, San Pedro; Kim S. Guzzino, Los Angeles; Robert W. Hulvey, Hermosa Beach, all of Calif.

[73] Assignee: TRW Inc., Redondo Beach, Calif.

[21] Appl. No.: 571,018

[22] Filed: Dec. 12, 1995

[51] Int. Cl.⁶ .................................................. H04N 9/45
[52] U.S. Cl. ........................... 348/549; 348/536; 331/20
[58] Field of Search ........................... 348/505, 506, 348/507, 508, 549, 536, 537, 538, 539; 358/17, 18, 19; 331/20, 17; 327/156, 159; H04N 9/45, 9/455, 5/12

[56] References Cited

U.S. PATENT DOCUMENTS

| | | |
|---|---|---|
| 3,534,169 | 10/1970 | Bockwoldt . |
| 4,491,862 | 1/1985 | Flamm .................... 358/21 R |
| 4,679,005 | 7/1987 | Tatami . |
| 4,694,326 | 9/1987 | Demmer . |
| 4,713,690 | 12/1987 | Watanabe et al. . |
| 4,733,197 | 3/1988 | Chow . |
| 4,774,577 | 9/1988 | Takimoto . |
| 4,780,759 | 10/1988 | Matsushima et al. . |
| 4,884,040 | 11/1989 | Fling . |
| 5,153,725 | 10/1992 | Masaike . |
| 5,159,292 | 10/1992 | Canfield et al. ............... 331/1 A |
| 5,235,422 | 8/1993 | Ido et al. . |
| 5,355,172 | 10/1994 | Adams et al. ............... 348/505 |
| 5,416,527 | 5/1995 | Casey . |
| 5,539,357 | 7/1996 | Rumreich .................... 331/17 |

Primary Examiner—John K. Peng
Assistant Examiner—Chris Grant
Attorney, Agent, or Firm—Michael S. Yatsko

[57] ABSTRACT

A digital phase error detector for locking to a color subcarrier signal in an analog video signal. The digital phase error detector includes a digitizer responsive to a sample clock which generates a first digital data stream from the analog video signal. Filtering circuitry filters the first digital data stream to generate a second data stream by substantially eliminating DC offset of the color subcarrier signal digitized by the digitizer. A mixer mixes the second digital data stream to generate a third digital data stream representing sum and difference frequencies of a product of the color subcarrier signal and a reference clock. An accumulator accumulates this product which represents a phase error between the color subcarrier signal and the reference clock. A voltage controlled oscillator is responsive to this phase error for generating the sample clock.

24 Claims, 3 Drawing Sheets

DIGITAL PHASE ERROR DETECTOR FOR LOCKING TO COLOR SUBCARRIER OF VIDEO SIGNALS

BACKGROUND OF THE INVENTION

1. Field of the Invention

This invention relates generally to digital processing of analog video signals and, more particularly to a digital phase error detector for locking to a color subcarrier (i.e. color burst) of an analog video signal.

2. Discussion of the Related Art

Today there are many video products which process digital representations of analog video signals. For example, video digitizers, digital video scramblers and descramblers, televisions, video cassette recorders and video recorders which record analog video in a digital format. In each of these video products, the analog video signal is generally digitized and stored in memory for subsequent use.

If the analog video signal is not digitized and stored in memory or read out of memory substantially the same way as it is received, several problems are encountered (i.e. analog video signal is out of sync). These problems include the displacement of raster lines which causes the picture to blur and color fringing which causes incorrect color in the picture. In order for the analog video signal received by the video product to be processed in synchronization, phase-locking of the analog video signal is generally performed to provide a digital reference clock using conventional analog circuitry. However, use of such conventional analog phase-locking circuitry has been found to be inadequate for most digital processing purposes because of the above-identified problems, as well as because of the large number and size of the components required.

Digital phase-locking can be used in place of analog phase-locking to reduce or eliminate the blurring and color fringing, however, use of conventional digital phase-locking techniques also has several disadvantages. Specifically, a very large number of digital gates are ordinarily required which is costly. This also makes it extremely difficult, if not impossible to integrate such circuitry into a single integrated circuit. Still further, such conventional digital techniques generally require a separate digital circuit which is exclusively used only for phase-locking purposes. Moreover, DC offset in each raster line (i.e. horizontal line) of the digital data may also cause the raster lines to be displaced thus causing the picture to blur.

What is needed then is a digital phase error detector for locking to a color subcarrier of an analog video signal which does not suffer from the above-mentioned disadvantages. This will, in turn, eliminate raster line misalignment and color fringing, reduce the number of gates required and the cost, and enable the system to be incorporated into a single integrated circuit with other video processing circuitry. It is, therefore, an object of the present invention to provide such a digital phase error detector for locking to a color subcarrier of an analog video signal.

SUMMARY OF THE INVENTION

In accordance with the teachings of the present invention, a digital phase error detector for locking to a color subcarrier of an analog video signal is disclosed. The digital phase error detector locks to the color subcarrier to provide a sample clock (SCLK) used for digitizing the analog video signal. This is basically achieved by digitizing the color subcarrier signal in the analog video signal and using this color subcarrier signal to generate a reference clock (RCLK) having substantially the same frequency as the color subcarrier signal.

In one preferred embodiment, a digital phase error detector for locking to a color subcarrier signal of an analog video signal includes a digitizer which is responsive to a sample clock (SCLK) for digitizing the color subcarrier signal in the analog video signal to generate a first digital data stream. Filtering circuitry is used to generate a second digital data stream by filtering the first digital data stream to substantially eliminate DC offset of the color subcarrier signal digitized by the digitizer. A mixer generates a third digital data stream representing sum and difference frequencies of a product of the color subcarrier signal and a reference clock (RCLK). An accumulator accumulates this product which represents the phase error between the color subcarrier signal and the reference clock (RCLK). A voltage controlled oscillator responsive to this phase error then generates the sample clock (SCLK).

Use of the present invention provides a digital phase error detector for locking to a color subcarrier of an analog video signal. As a result, the aforementioned disadvantages associated with current phase locking circuitry has been substantially eliminated.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENT(S)

The following description of the preferred embodiment concerning a digital phase error detector for locking to a color subcarrier of an analog video signal is merely exemplary in nature and is in no way intended to limit the invention or its application or uses. Moreover, while the present invention is described in detail below with reference to NTSC (National Television System Committee) format video signals, it would appreciated by those skilled in the art that the present invention, as defined by the appended claims, is clearly not limited only to NTSC format video signals and may include other types of video signal formats such as PAL (Phase Alternation by Line) or SECAM (Sequence a Memoire).

Figure 1:
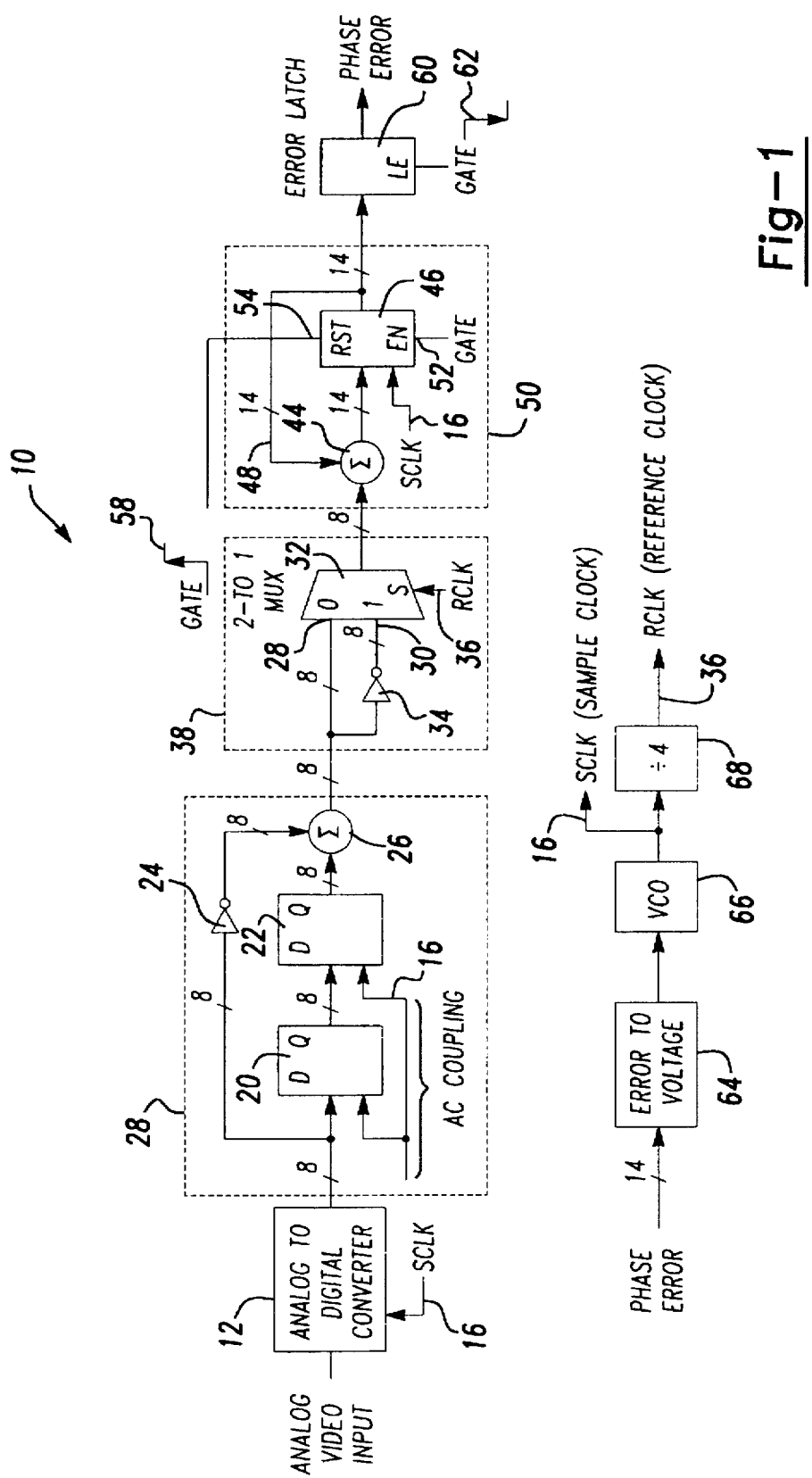
FIG. 1 is a schematic block diagram of one preferred embodiment of the present invention.
Figure 2:
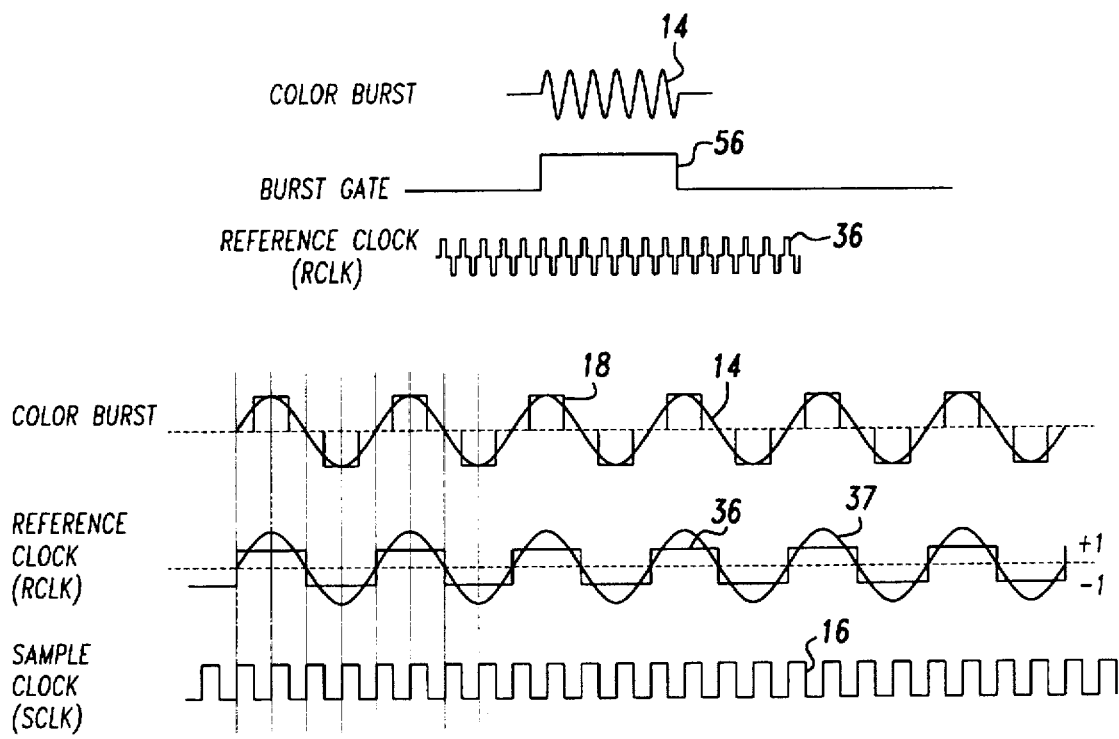
FIG. 2 is a series of various waveform diagrams utilized and generated by the present invention.

Referring to FIG. 1, a schematic block diagram of a digital phase error detector 10 for locking to a color subcarrier of an analog video signal is shown. The digital phase error detector 10 utilizes an 8-bit analog-to-digital converter 12 for receiving an analog video signal in NTSC format. The analog-to-digital converter 12 is generally already existing in video product and does not have to be duplicated for the phase error detector 10. The analog video signal includes a color burst signal 14, as shown in FIG. 2, which is between about 6 to 10 cycles of a sine wave of chrominance subcarrier frequency. This color burst signal 14 occurs about every 63.5 μsec. or 15.734KHz at the beginning of each raster line in the analog video signal. The color burst signal 14 is the signal used to establish a reference for demodulating the chrominance signal and is the portion of the analog video signal which the digital phase error detector 10 will be phase-locked or frequency-locked with. This will ultimately provide a stable sample clock (SCLK) 16 for use when digitizing the analog video signal with the analog-to-digital converter 12, as well as for clocking the digital data into memory and subsequently reading the digital data out of memory. An enlarged waveform of the color burst signal 14 is also shown in FIG. 2, which includes a square wave representation 18 of the color burst signal 14 superimposed over the color burst signal 14.

The analog-to-digital converter 12 digitizes the color burst signal 14 in the analog video signal and outputs an 8-bit digital representation of the square wave 18 each time the analog-to-digital converter 12 is clocked by the sample clock (SCLK) 16. The color burst signal 14 is sampled by the analog-to-digital converter 12 at an arbitrary but constant phase which means that the digital phase error detector 10 is essentially functioning as a frequency-locked loop. Each 8-bit sample of digital data represents a number corresponding to the amplitude of the square wave 18. For example, if the square wave 18 is substantially in phase with the sample clock (SCLK) 16 and the peak-to-peak amplitude of the square wave 18 sampled is 50 millivolts with a center reference of 60 millivolts, the 8-bit samples would toggle between the numbers 85, 60, 35, 60, 85, etc. This is because it takes four (4) sample clock pulses (SCLK) 16 to sample one (1) cycle of the color burst signal 14 since the sample clock (SCLK) 16 has a frequency of about 14.318 MHz which is about four (4) times the color burst frequency of about 3.58 MHz.

The digital data stream from the analog-to-digital converter 12 is applied along an 8-bit parallel data bus (i.e. 8 lines) to a first 8-bit digital register 20 and a second 8-bit digital register 22, as well as to an inverter 24, with the outputs being subsequently summed by an adder 26. This combination essentially forms a bandpass filter 28 which performs AC coupling to eliminate the DC offset from the color burst signal 14 as it is initially digitized and received in the phase detector 10. Each 8-bit digital register 20 and 22 delays the digital data stream by one (1) sample clock (SCLK) 16, thus a delay of two (2) sample clocks (SCLK) 16 occurs before the digital data reaches the adder 26 through the registers 20 and 22. The digital data stream that is applied to the inverter 24 is inverted before it is also applied to the adder 26.

It should be noted that the entire phase error detector 10 utilizes two-s (2's) complement digital signals whereby when the most significant bit (MBS) is a "1", this represents a negative number, while if the most significant bit or top bit is a "0", this represents a positive number. The 2-s (twos) complement format is used when the digital data is inverted, as well as for determining leading and lagging phase error. Accordingly, for proper two's complement arithmetic in the adder 26 a digital "1" is fed into the adder 26 carry input.

At the adder 26, the inverted digital data is summed with the digital data delayed by two (2) sample clocks (SCLK) 16 or 180° out of phase with the digital data coming from the inverter 24. By doing this, the DC offset of the color burst signal 14 is eliminated as it is sampled and before further digital processing is conducted. This assures that the DC offset from raster line to raster line of data is eliminated, which is needed because DC offset would create an unwanted error signal at the output of a mixer utilized in the present invention, as well as subsequent circuitry which will be discussed in detail shortly. This AC coupling circuit also acs as a band pass filter centered at the color subcarrier frequency.

Figure 3:
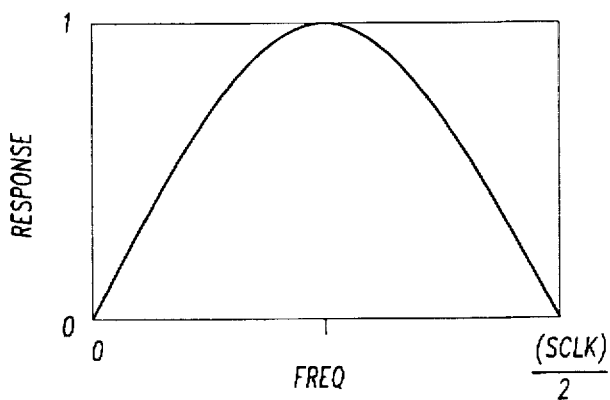
FIG. 3 is a graph of the filter response of a bandpass filter utilized in the present invention.

For example, as previously indicated, assuming that the peak-to-peak voltage of the square wave 18 is 50 millivolts with a 60 millivolt center reference, the 60 millivolt center reference would be eliminated so that you would have a square wave 18 having a peak-to-peak voltage of 100 millivolts with a center reference of zero (0) millivolts. Referring to FIG. 3, the filter response of the bandpass filter 28 is shown. As seen in FIG. 3, the filter 28 has a maximum response at the sample clock (SCLK) 16 frequency of about 3.58 MHz.

Figure 4:
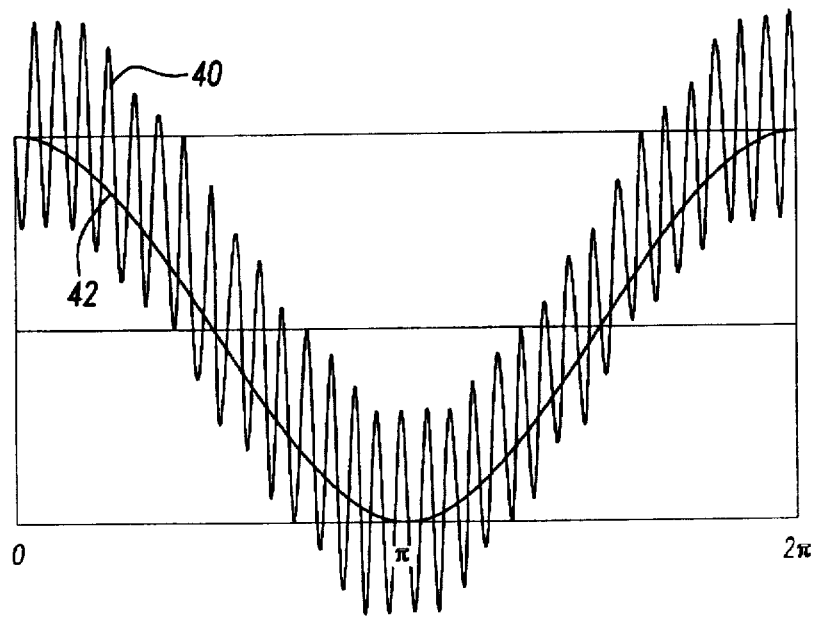
FIG. 4 is a waveform diagram representing an analog representation of an output from a mixer utilized in the present invention.

The digital data stream from the bandpass filter 28 is applied to a "0" input 28 and a "1" input 30 of a 2 to 1 multiplexer 32, with the digital data applied to the "1" input 30 being inverted by an inverter 34 before being applied to the multiplexer 32. The multiplexer 32 acts as a 2 to 1 switch and switches based on a reference clock (RCLK) 36, which essentially forms a multiplier or mixer 38. The reference clock (RCLK) 36, as shown in FIG. 2, has a frequency of about 3.58 MHz which is about one-fourth the sample clock (SCLK) 16 frequency of about 14.318 MHz. The reference clock (RCLK) 36 is essentially the same frequency as the color burst signal 14. The reference clock (RCLK) 36 provides two high clocks and two low clocks causing two cycles of noninverting digital data to pass through the multiplexer 32 and two cycles of inverted digital data to pass through the multiplexer 32 (i.e. "0", "0", "1", "1", "0", ... ). An analog representation of the output from the mixer 38 is shown in FIG. 4. This analog representation essentially consists of the product of the input sine wave or color burst signal 14 and the reference clock (RCLK) 36 sine wave 37, shown in FIG. 2, which is the sum and the difference of the frequencies of these sine waves. The high frequency waveform 40 consists of both the sum and difference of the waveforms (i.e. $F_{COLOR\ BURST}+F_{RCLK}$ and $F_{COLOR\ BURST}-F_{RCLK}$) and the low frequency waveform 42 consists of the mean of the waveform 40 known in the art as the "beat note." Using the mean or essentially the difference frequency allows the phase error to be determined between the color burst signal 14 and the reference clock (RCLK) 36 similar to a phase detector where a known reference frequency is multiplied times its quadrature to get phase error. If the low frequency waveform 42 is flat line or DC, this indicates no phase error between the waveforms 14 and 37.

The digital data outputted from the multiplexer 32 is applied to a 14-bit adder 44 in combination with a 14-bit digital register 46 having a feedback loop 48. This forms an accumulator 50 which in combination with the mixer 38 generally forms a phase detector. Additionally, the accumulator 50 performs the function of filtering out the sum frequency component (i.e. $F_{COLOR\ BURST}+F_{RCLK}$) of waveform 40. The data lines or bits is increased from 8-bits to 14-bits following the adder 44 to accommodate for the accumulation of data in the 14-bit digital register 46. The 14-bit digital register 46 includes an enable port 52 and a reset port 54 which are triggered by a burst gate signal 56, shown in FIG. 2, which originates from a gate 58. The burst gate signal 56 is high when the color burst signal 14 is active and goes low when the six (6) to ten (10) cycles of the color burst signal 14 ends. Thus, about twenty-four (24) to forty

(40) sample clocks (SCLK) 36 worth of digital data is accumulated from the mixer 38 in the 14-bit digital register 46. This data is accumulated as the enable port 52 is held high from the burst gate signal 56. As the data is accumulated, the sum components (i.e. $F_{COLOR\ BURST} + F_{RCLK}$) generally cancel themselves out and the difference component (i.e. $F_{COLOR\ BURST} - F_{RCLK}$) or beat note is all that remains. When the burst gate signal 56 goes low, the reset port 54 resets the accumulator to zero (0) as the accumulated data is simultaneously applied to a 14-bit digital register or error latch 60 on the trailing edge of a gate 62.

This accumulated digital data represents the phase error between the color burst signal 14 and the reference clock (RCLK) 36 and is stored in the error latch 60 until the error latch 60 is subsequently gated to receive a new phase error. If the sample clock (SCLK) 16 is accurate or correct, the digital value accumulated in the accumulator 50 should equal zero (i.e. waveform 42 would have a Frequency=0 or DC). If the phase of the sample clock (SCLK) 16 is advanced, a positive number would result, while if the phase is retarded, a negative number would result under two's complement arithmetic.

The phase error stored in the error latch 60 is continuously applied to an error-to-voltage circuit 64 which converts the digital phase error to a DC control voltage so as to vary the frequency of a voltage controlled oscillator (VCO) 66 to track the frequency of the color burst signal 14 with the reference clock (RCLK) 36, via a divide by four (4) circuit 68. This ultimately implements a phase-lock or frequency-lock loop which generates the sample clock (SCLK) 16 having a frequency of about 14.318 MHz to be used during digitization of the analog video signal, as well as for clocking this digitized data into and out of memory (not shown) for subsequent manipulation by a video product.

Figure 5:
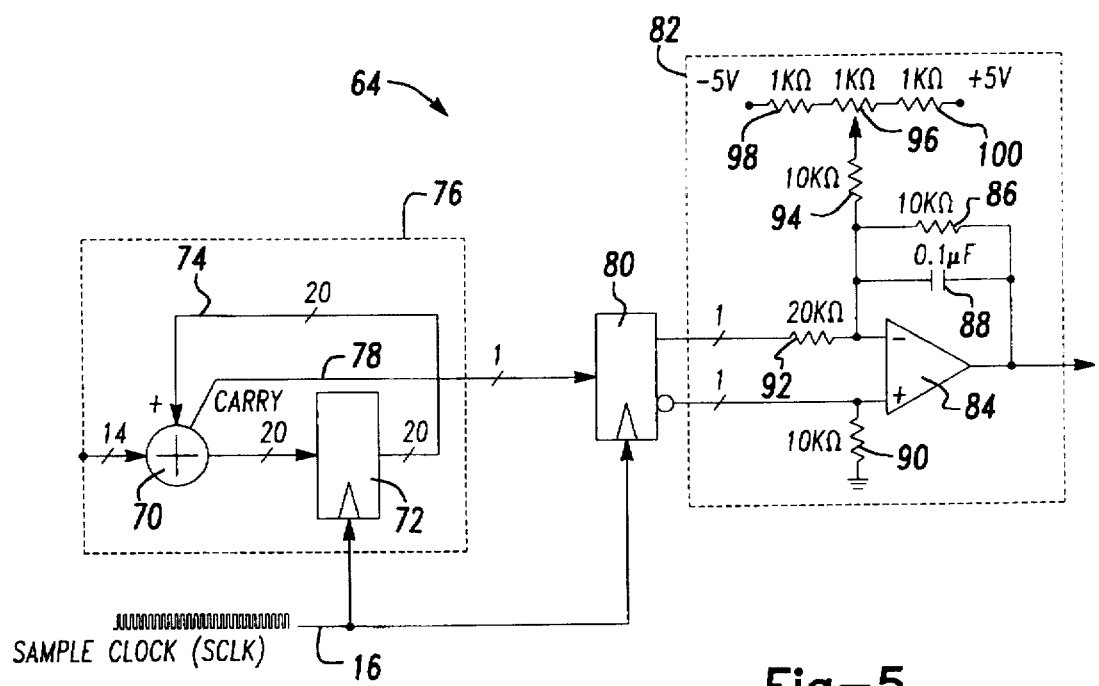
FIG. 5 is a schematic block diagram of an error to voltage circuit utilized in the present invention.

Turning to FIG. 5, a detailed schematic block diagram of the error-to-voltage circuit 64 is shown. The error-to-voltage circuit 64 includes an 8-bit adder 70 and an 8-bit digital register 72 having a feedback loop 74. This forms an accumulator 76 similar to the accumulator 50, shown in FIG. 1. The accumulator 76 has an output 78 which is the carry bit from the adder 70. As the adder 70 continuously sums the digital data from the error latch 60 and the digital data exceeds the 8-bit limit, the carry bits 78 are not carried over to another summer, but are sent to a 1-bit digital register 80. The digital data from the error latch 60 is stable for each raster line period following each color burst signal 14 which has been digitized. The duty cycle of the carry bits are directly proportional to the value of the digital data continuously entering the adder 70, which creates a continuous pulse width modulated (PWM) output 78 having a typical duty cycle of between about 30% to 70% with the output varying once per raster line of digital data. This forms an inexpensive digital-to-analog converter which uses significantly less gates to produce.

The carry bits are then applied to the 1-bit digital register 80 to generate a clean differential phase error signal which is applied to an analog loop filter 82 primarily consisting of an op-amp 84. The op-amp 84 is configured with a 10K ohm resistor 86 in parallel with a 0.1 μF capacitor 88 which are across the negative feedback loop of the op amp 84. At the positive input of the op-amp 84 is a 10 k ohm hold down resistor 90 and at the inverting input there is a 20K ohm series resistor 92 with a 10K ohm resistor 94 in parallel with a variable 1K ohm resistor 96 positioned between two additional 1K ohm resistors 98 and 100 which are each tied to a voltage of −5 volt and +5 volts, respectively. This creates a clean DC output voltage which is applied to the VCO 66. The variable 1K ohm resistor 96 provides a voltage bias term for the VCO 66 to allow centering of the VCO 66 operating voltage range near zero (0) phase error at the standard 14.318 MHz frequency, maximizing the phase-locked or frequency-locked loop operating range.

Use of the digital phase error detector 10 for locking to a color subcarrier of an analog video signal greatly reduces the overall gate count and cost of the circuit by using nonconventional digital circuitry to perform the required functions. This ultimately enables an accurate sample clock (SCLK) 16 to be generated and subsequently used in a video product which processes digital representations of analog video signals such as video digitizers, digital video scramblers or descramblers, televisions and video cassette recorders. In addition, the digital phase error detector 10 generates the sample clock (SCLK) 16 for the analog-to-digital converter 12 which would already be included in a conventional digital video processing product. The phase error detector 10 further eliminates the DC offset as it is sampled to reduce any misalignment caused by DC offsets varying between raster lines. Still further, the phase error detector 10 performs a multiplying or mixing function in the mixer 38 using a nonconventional multiplier or mixer which also greatly reduces cost and gate count. This ultimately enables the phase error detector 10 to be incorporated into a single integrated circuit with other video processing circuitry.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A digital phase error detector for locking to a color subcarrier signal in an analog video signal, said digital phase error detector comprising:

digitizing means for digitizing said color subcarrier signal in said analog video signal to generate a first digital data stream, said digitizing means being responsive to a sample clock signal;

filtering means for generating a second digital data stream by filtering said first digital data stream to substantially eliminate DC offset of said color subcarrier signal digitized by said digitizing means;

mixing means for generating a third digital data stream from said second digital data stream representing sum and difference frequencies of a product of said color subcarrier signal and a reference clock signal;

accumulator means for accumulating said product of said third digital data stream, said accumulated product representing a phase error between said color subcarrier signal and said reference clock signal which is substantially free of DC offset of said color subcarrier signal; and a voltage controlled oscillator responsive to said phase error for generating said sample clock signal.

2. The digital phase error detector as defined in claim 1 wherein said digitizing means includes an analog-to-digital converter, said analog-to-digital converter receives said color subcarrier signal in said analog video signal and digitizes said color subcarrier signal in response to the sample clock signal to generate said first digital data stream.

3. The digital phase error detector as defined in claim 1 wherein said filtering means includes an adder for receiving an inverted first digital data stream and said first digital data stream 180° out of phase with the inverted first digital data stream to substantially eliminate the DC offset of said color digitizer signal digitized by the digitizing means.

4. The digital phase error detector as defined in claim 3 wherein said filtering means further includes a first digital register and a second digital register for delaying said first digital data stream 180° and an inverter for inverting said first digital data stream to generate said inverted first digital data stream.

5. The digital phase error detector as defined in claim 4 wherein said filtering means is responsive to said sample clock signal.

6. The digital phase error detector as defined in claim 1 wherein said mixing means includes a multiplexer for receiving said second digital data stream from said filtering means, said multiplexer being responsive to said reference clock signal.

7. The digital phase error detector as defined in claim 6 wherein said multiplexer includes a first input and a second input, said first input receiving said second digital data stream and said second input receiving an inverted second digital data stream.

8. The digital phase error detector as defined in claim 1 wherein said accumulator means includes a digital register operable to accumulate said product while said color subcarrier signal is active.

9. The digital phase error detector as defined in claim 8 wherein said accumulator means further includes an adder having a feedback input.

10. The digital phase error detector as defined in claim 1 further comprising an error latch means for latching said accumulated product from said accumulator means.

11. The digital phase error detector as defined in claim 1 further comprising phase error means for converting said accumulated product representing said phase error to a control voltage to control said voltage controlled oscillator.

12. The digital phase error detector as defined in claim 11 wherein said phase error means includes an accumulator and a loop filter for generating said control voltage.

13. The digital phase error detector as defined in claim 12 wherein said accumulator generates a continuous pulse width modulated (PWM) output which is updated as each color subcarrier signal is digitized.

14. The digital phase error detector as defined in claim 1 further comprising a divide by four circuit for generating said reference clock signal from said voltage controlled oscillator.

15. The digital phase error detector as defined in claim 1 wherein said sample clock signal has a frequency of about four times the frequency of said reference clock signal.

16. The digital phase error detector as defined in claim 15 wherein said reference clock signal has a frequency substantially the same as said color subcarrier signal.

17. The digital phase error detector as defined in claim 1 wherein said analog video signal has a format selected from the group consisting of NTSC (National Television System Committee), PAL (Phase Alternation by Line) and SECAM (Sequence a Memoire).

18. A digital phase error detector for locking to a color subcarrier signal in an analog video signal, said digital phase error detector comprising:

a digitizer, said digitizer being responsive to a sample clock signal and operable to digitize said color subcarrier signal to generate a first digital data stream from said analog video signal;

a bandpass filter, said bandpass filter operable to generate a second digital data stream by filtering said first digital data stream to substantially eliminate DC offset of said color subcarrier signal digitized by said digitizer;

a mixer, said mixer operable to generate a third digital data stream from said second digital data stream representing sum and difference frequencies of a product of said color subcarrier signal and a reference clock signal;

an accumulator, said accumulator operable to accumulate said product of said third digital data stream representing a phase error between said color subcarrier signal and said reference clock signal which is substantially free of DC offset of said color subcarrier signal;

phase error circuitry, said phase error circuitry operable to convert said phase error to a control voltage; and a voltage controlled oscillator responsive to said control voltage for generating said sample clock signal.

19. A digital phase error detector as defined in claim 18 wherein said bandpass filter includes a first digital register and a second digital register for delaying said first digital data stream 180° out of phase with an inverted first digital data stream, an inverter for inverting said first digital data stream to generate said inverted first digital data stream, and an adder for receiving said inverted first digital data stream and said first digital data stream 180° out of phase with said inverted first digital data stream to substantially eliminate the DC offset of said color subcarrier signal digitized by the digitizer.

20. The digital phase error detector as defined in claim 18 wherein said phase error circuitry includes an accumulator and a loop filter for generating said control voltage, said accumulator providing a continuous pulse width modulated (PWM) output.

21. The digital phase error detector as defined in claim 18 wherein said sample clock signal has a frequency of about four times the frequency of said reference clock signal and said reference clock signal has a frequency substantially the same as said color subcarrier signal.

22. A method for locking to a color subcarrier signal in an analog video signal, said method comprising the steps of:

digitizing said color subcarrier signal in said analog video signal to generate a first digital data stream;

filtering said first digital data stream to substantially eliminate DC offset of said digitized color subcarrier signal to generate a second digital data stream;

mixing said second digital data stream to generate a third digital data stream representing sum and difference frequencies of a product of said color subcarrier signal and a reference clock signal;

accumulating said product which is substantially free of DC offset of said color subcarrier signal;

converting said product to a control voltage; and controlling a voltage controlled oscillator with said control voltage to generate a sample clock signal.

23. The method as defined in claim 22 wherein the step of filtering said first digital data stream further includes the steps of:

generating an inverted first digital data stream;

generating a first digital data stream 180° out of phase with said inverted first digital data stream; and adding said inverted first digital data stream with said first digital data stream 180° out of phase with said first inverted digital data stream.

24. The method as defined in claim 22 wherein the step of converting said product to a control voltage further includes the step of generating a continuous pulse width modulated (PWM) output.

* * * * *